F. N. BARD.
GASKET FOR FLEXIBLE JOINTS.
APPLICATION FILED AUG. 6, 1915.

1,347,470.

Patented July 20, 1920.

Witnesses.

Inventor:
Francis N. Bard
by Parker & Carter
his Attys.

UNITED STATES PATENT OFFICE.

FRANCIS N. BARD, OF HIGHLAND PARK, ILLINOIS.

GASKET FOR FLEXIBLE JOINTS.

1,347,470.

Specification of Letters Patent. Patented July 20, 1920.

Application filed August 6, 1915. Serial No. 43,996.

*To all whom it may concern:*

Be it known that I, FRANCIS N. BARD, a citizen of the United States, residing at Highland Park, in the county of Cook and State of Illinois, have invented a certain new and useful Improvement in Gaskets for Flexible Joints, of which the following is a specification.

This invention relates to improvements in gaskets for flexible joints and has for its object to provide a new and improved gasket of this description. The invention is illustrated in the accompanying drawings, wherein—

Like numerals refer to like parts throughout the several figures.

Figure 1:
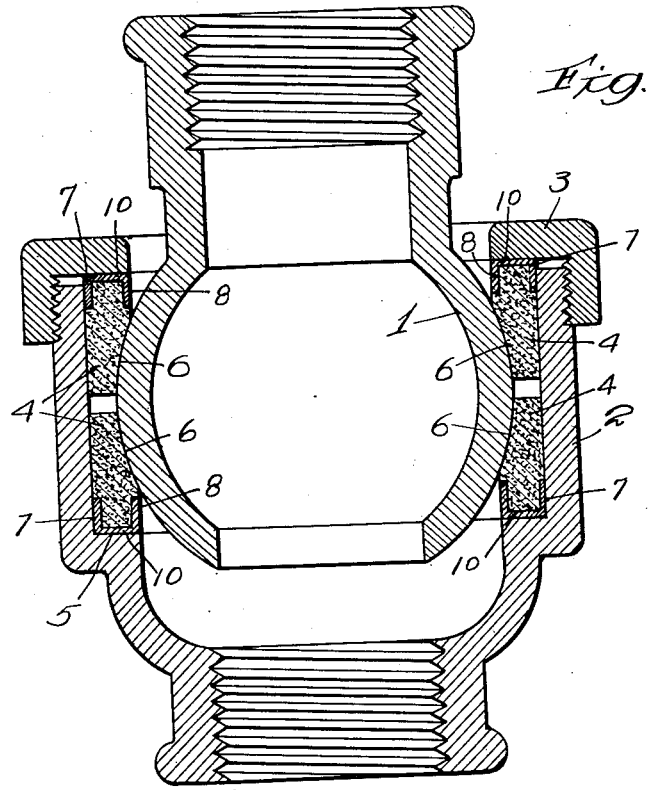
Figure 1 is a sectional view through a flexible joint showing the gaskets in position.
Figure 2:
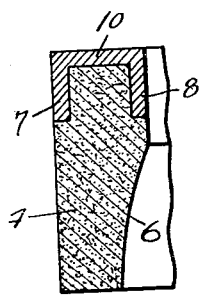
Fig. 2 is an enlarged sectional view through the upper gasket shown in Fig. 1.

The gasket herein shown is particularly adapted to be used in connection with a flexible joint of the kind illustrated in Fig. 1, wherein there is a ball 1 which fits into a casing 2, the casing being provided with a cap or nut 3 which is screw threaded thereto. Contained within the casing 2 are the gaskets 4.

In assembling the device, the inner gasket is first placed in position, the ball is then placed in the socket and the outer gasket 4 is then placed in position and the cap 3 screwed to the casing 2.

It will thus be seen that the gaskets in this case prevent the longitudinal movement of the ball, the outer gasket being held against movement by the cap 3, and the inner gasket being held against movement by the shoulder 5 of the casing 2. It will thus be seen that the gaskets take the pressure of the ball. Each gasket is provided with a curved face 6 which engages the ball. The ends of the gaskets which engage the cap 3 and the shoulder 5 are provided with means for protecting them against distortion due to the pressure put upon them. As herein shown, this protecting device consists of a piece of metal having three portions 7, 8 and 10 at an angle to each other, the metal being embedded in the non-metallic material of the gasket. It will be noted that the protecting device here shown is an annular rigid piece having an annular groove extending entirely therearound and into which the non-metallic gasket is molded, the outer and inner faces of this rigid piece being substantially flush with the outer and inner faces of the gasket. It will therefore be seen that the edges of these gaskets which bear against the cap 3 and the shoulder 5 and thus take the pressure at these points, are arranged so as to resist this pressure, and it will further be seen that these edges of the gaskets are also arranged so that they cannot break down because the rigid protecting piece consisting of the portions 7, 8 and 10 hold these edges in proper position and prevent them from becoming damaged or distorted. Each gasket, it will be noted, consists of a cylindrical piece of non-metallic material having its inner face cut away or so shaped near one end of the gasket as to receive the ball of the flexible joint, the other end of the gasket being of full thickness and having the portions 7 and 8 embedded therein.

I claim:

A ball and socket joint comprising a ball, a casing into which said ball is received, a cap for said casing, one or more molded non metallic gaskets within said casing, said gaskets being engaged by said ball, an annular rigid piece having an annular groove extending entirely therearound and into which the non metallic gasket is molded, the outer and inner faces of said rigid piece being substantially flush with the outer and inner faces of the gasket.

In testimony whereof, I affix my signature in the presence of two witnesses this 22nd day of July, 1915.

FRANCIS N. BARD.

Witnesses:
 ELLA THIEME,
 CHRISTINA DEANS.